(12) United States Patent
Li et al.

(10) Patent No.: US 10,547,542 B2
(45) Date of Patent: Jan. 28, 2020

(54) LSP ESTABLISHMENT METHOD AND NETWORK DEVICE

(71) Applicant: HUAWEI TECHNOLOGIES CO., LTD., Shenzhen (CN)

(72) Inventors: Zhenbin Li, Beijing (CN); Jianguo Xue, Beijing (CN); Xinzong Zeng, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 194 days.

(21) Appl. No.: 14/862,637

(22) Filed: Sep. 23, 2015

(65) Prior Publication Data

US 2016/0014022 A1 Jan. 14, 2016

Related U.S. Application Data

(63) Continuation of application No. PCT/CN2014/070077, filed on Jan. 3, 2014.

(30) Foreign Application Priority Data

Apr. 1, 2013 (CN) .......................... 2013 1 0111342
Jul. 8, 2013 (CN) .......................... 2013 1 0284304

(51) Int. Cl.
*H04L 12/723* (2013.01)
*H04L 12/721* (2013.01)
*H04L 12/911* (2013.01)

(52) U.S. Cl.
CPC .............. *H04L 45/50* (2013.01); *H04L 45/26* (2013.01); *H04L 47/72* (2013.01)

(58) Field of Classification Search
CPC ....................................................... H04L 45/50
See application file for complete search history.

(56) References Cited

U.S. PATENT DOCUMENTS 7,489,695 B1   2/2009 Ayyangar
7,558,199 B1 * 7/2009 Minei ................. H04L 41/0896
                                                      370/230

(Continued)

FOREIGN PATENT DOCUMENTS

CN        101510851        8/2009
CN        102239681        11/2011

(Continued)

OTHER PUBLICATIONS

Ayyanger, A. et al.; RFC 5150; LSP Stitching with Generalized Multiprotocol Label Switching Traffic Engineering (GMPLS TE); https://tools.ietf.org/html/rfc5150; Feb. 10, 2008.*

(Continued)

*Primary Examiner* — Sulaiman Nooristany
(74) *Attorney, Agent, or Firm* — Womble Bond Dickinson (US) LLP

(57) ABSTRACT

An LSP establishment method and a network device, where the method includes: generating, by a first network device, a first Path message, where the first Path message carries an address of a second network device, and the first Path message is used to request establishment a first LSP; and sending, the first Path message to the second network device, and establishing the first LSP, where the first Path message further carries an address of a target network device, so that the second network device stitches the first LSP and a second LSP according to the address of the target network device, so as to form a third LSP from the first network device to the target network device. This technical solutions are conducive to implementing convergence of an access network of an IP RAN and an IP backbone network.

19 Claims, 10 Drawing Sheets

(56) References Cited

U.S. PATENT DOCUMENTS

| | | | | |
|---|---|---|---|---|
| 7,570,649 B2* | 8/2009 | Qian | H04L 12/18 370/351 |
| 7,936,780 B1 | 5/2011 | Kompella | |
| 7,937,492 B1* | 5/2011 | Kompella | H04L 45/22 370/351 |
| 7,940,695 B1* | 5/2011 | Bahadur | H04L 43/0811 370/254 |
| 8,259,564 B1* | 9/2012 | Gredler | G06F 11/2005 370/218 |
| 8,571,029 B1* | 10/2013 | Aggarwal | H04L 45/50 370/256 |
| 8,797,886 B1* | 8/2014 | Kompella | H04L 43/0811 370/242 |
| 8,902,766 B2* | 12/2014 | Kini | 370/252 |
| 9,130,668 B2* | 9/2015 | Ceccarelli | H04B 10/038 |
| 2003/0028818 A1* | 2/2003 | Fujita | H04L 1/22 714/4.2 |
| 2003/0043792 A1* | 3/2003 | Carpini | H04L 45/00 370/386 |
| 2003/0137971 A1* | 7/2003 | Gibson | H04L 12/5695 370/351 |
| 2003/0142643 A1* | 7/2003 | Yang | H04L 45/50 370/328 |
| 2003/0189898 A1* | 10/2003 | Frick | H04L 45/00 370/227 |
| 2004/0081085 A1* | 4/2004 | De Cnodder | H04L 45/00 370/225 |
| 2004/0160958 A1* | 8/2004 | Oh | H04L 12/5601 370/395.1 |
| 2005/0141504 A1* | 6/2005 | Rembert | H04L 63/0272 370/392 |
| 2005/0160171 A1* | 7/2005 | Rabie | H04L 12/5695 709/227 |
| 2007/0076725 A1* | 4/2007 | Papadimitriou | H04L 12/5601 370/395.54 |
| 2007/0217428 A1* | 9/2007 | Wijnands | H04L 45/00 370/395.5 |
| 2008/0002699 A1* | 1/2008 | Rajsic | H04L 12/5601 370/392 |
| 2008/0095171 A1* | 4/2008 | Kim | H04L 41/12 370/395.2 |
| 2009/0268731 A1* | 10/2009 | Narayanan | H04L 12/18 370/390 |
| 2010/0177784 A1* | 7/2010 | Asati | H04L 12/66 370/463 |
| 2011/0032938 A1* | 2/2011 | Kunjidhapatham | H04L 12/4633 370/392 |
| 2011/0199891 A1* | 8/2011 | Chen | H04L 45/22 370/218 |
| 2011/0251712 A1 | 10/2011 | Schlueter et al. | |
| 2012/0008622 A1* | 1/2012 | Cao | H04L 12/4633 370/389 |
| 2012/0155327 A1* | 6/2012 | Fondelli | H04L 45/50 370/254 |
| 2012/0213224 A1 | 8/2012 | Chen | |
| 2012/0281526 A1* | 11/2012 | Singamsetty | H04L 43/10 370/225 |
| 2013/0003740 A1* | 1/2013 | Zheng | H04L 12/4633 370/392 |
| 2013/0010790 A1* | 1/2013 | Shao | H04L 45/16 370/390 |
| 2013/0058324 A1* | 3/2013 | Zhang | H04L 45/50 370/351 |
| 2013/0163981 A1* | 6/2013 | Ceccarelli | H04J 14/0221 398/2 |
| 2013/0208582 A1* | 8/2013 | Wijnands | H04L 49/552 370/218 |
| 2013/0259067 A1* | 10/2013 | Agmon | H04L 41/0896 370/468 |
| 2014/0016644 A1* | 1/2014 | Vasseur | H04L 45/00 370/392 |
| 2014/0064062 A1* | 3/2014 | Taillon | H04L 45/22 370/225 |
| 2014/0280711 A1* | 9/2014 | Asati | H04L 67/10 709/217 |
| 2014/0307538 A1* | 10/2014 | Iovanna | H04L 45/64 370/218 |
| 2015/0163125 A1* | 6/2015 | Caviglia | H04L 45/44 370/254 |
| 2015/0186202 A1* | 7/2015 | Wang | H04L 45/04 714/57 |
| 2015/0195195 A1* | 7/2015 | Zhang | H04L 45/50 370/400 |
| 2015/0304214 A1* | 10/2015 | Ye | H04L 45/22 370/392 |

FOREIGN PATENT DOCUMENTS

| | | |
|---|---|---|
| CN | 102624609 | 8/2012 |
| WO | WO 2012/115908 A1 | 8/2012 |
| WO | WO 2012/117317 A1 | 9/2012 |

OTHER PUBLICATIONS

Extended European Search Report dated Mar. 4, 2016 in corresponding European Patent Application No. 14779218.8.

Ayyangar et al. "Label Switched Path Stitching with Generalized Multiprotocol Label Switching Traffic Engineering (GMPLS TE) draft-ietf-ccamp-isp-stitching-06.txt", Network Working Group, Apr. 2007, 19 pages.

Chinese Search Report dated Nov. 25, 2016 in corresponding Chinese Patent Application No. 2013102843040.

Chinese Office Action dated Nov. 30, 2016 in corresponding Chinese Patent Application No. 201310284304.0.

International Search Report dated Mar. 27, 2014, in corresponding International Application No. PCT/CN2014/070077.

Y. Rekhter et al., "Carrying Label Information in BGP-4," RFC3107, The Internet Society, May 2001, 8 pages.

International Search Report dated Mar. 27, 2014 in corresponding International Patent Application No. PCT/CN2014/070077.

"Extensions to Resource Reservation Protocol—Traffic Engineering (RSVP-TE) for Point-to-Multipoint TE Label Switched Paths (LSPs)," R. Aggarwal et al, RFC4875, May 2007, 53 pages.

European Communication under Rule 71(3) EPC in corresponding European Patent Application No. 14779218.8.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Type (Type)         |         Length (Length)       |
+-+-+-+-+-+-+-+-+-+-+-+-+-+-+-+-+-+-+-+-+-+-+-+-+-+-+-+-+-+-+-+-+
|                    IPv4 address (IPv4 address)                |
+-+-+-+-+-+-+-+-+-+-+-+-+-+-+-+-+-+-+-+-+-+-+-+-+-+-+-+-+-+-+-+-+
```

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Type (Type)         |         Length (Length)       |
+-+-+-+-+-+-+-+-+-+-+-+-+-+-+-+-+-+-+-+-+-+-+-+-+-+-+-+-+-+-+-+-+
|State (State) |            Reserved (Reserved)                 |
+-+-+-+-+-+-+-+-+-+-+-+-+-+-+-+-+-+-+-+-+-+-+-+-+-+-+-+-+-+-+-+-+
|                          IPv4 address                         |
+-+-+-+-+-+-+-+-+-+-+-+-+-+-+-+-+-+-+-+-+-+-+-+-+-+-+-+-+-+-+-+-+
```

FIG. 8

LSP ESTABLISHMENT METHOD AND NETWORK DEVICE

CROSS-REFERENCE TO RELATED APPLICATIONS

This application is a continuation of International Application No. PCT/CN2014/070077, filed on Jan. 3, 2014, which claims priority to Chinese Patent Application No. 201310111342.6, filed on Apr. 1, 2013 and Chinese Patent Application No. 201310284304.0, filed on Jul. 8, 2013, all of which are hereby incorporated by reference in their entireties.

TECHNICAL FIELD

Embodiments of the present invention relate to the communications field, and in particular, to a Label Switch Path (LSP) establishment method and a network device.

BACKGROUND

Seamless (Seamless) Multiprotocol Label Switching Multiprotocol Label Switching (MPLS) networking refers to a networking mode in which a unified IP/MPLS control plane is formed by all Internet Protocol (IP) devices managed by an operator, including access (fixed and/or mobile), aggregation, and backbone devices. In a current solution of an Radio Access Network (RAN) based on Seamless MPLS, when an access network and an IP backbone network are converged, the access network mainly stitches (Stitch) an LSP established by using the Label Distribution Protocol (LDP) and a Border Gateway Protocol (Border Gateway Protocol, BGP) LSP established in the IP backbone network, thereby completing convergence of the access network of the IP RAN and the IP backbone network. Because an LSP established by using MPLS traffic engineering (Traffic Engineering, TE) has rich TE attributes and may implement a function such as automatic bandwidth adjustment, it is an inevitable trend to use MPLS TE to establish an LSP in an access network of an IP RAN. However, no technical solution is currently available for stitching an LSP based on Resource Reservation Protocol-Traffic Engineering (Resource Reservation Protocol-Traffic Engineering, RSVP-TE) and an LSP established in an IP backbone network, which is not conducive to implementing convergence of an access network of an IP RAN based on MPLS TE and an IP backbone network.

SUMMARY

Embodiments of the present invention provide an LSP establishment method and a network device, which is conducive to implementing stitching of an LSP based on RSVP-TE and an LSP established in an IP backbone network, and is conducive to implementing convergence of an access network of an IP RAN based on MPLS TE and an IP backbone network.

According to a first aspect, an embodiment of the present invention provides an LSP establishment method, including:

generating, by a first network device, a first path (Path) message based on RSVP-TE, where the first Path message carries an address of a second network device, and the first Path message is used to request establishment of a first LSP that is based on RSVP-TE and is from the first network device to the second network device; and sending, by the first network device, the first Path message to the second network device, and establishing the first LSP, where the first Path message further carries an address of a target network device, so that the second network device stitches the first LSP and a second LSP according to the address of the target network device, so as to further form a third LSP from the first network device to the target network device in an end-to-end manner, where the second LSP is an LSP pre-established between the second network device and the target network device.

In a first possible implementation manner of the first aspect, the establishing the first LSP includes receiving a first reservation (Resv) message that is sent by the second network device and is corresponding to the first Path message, where the first Resv message includes an indication flag used to indicate whether the first LSP and the second LSP are successfully stitched, and the method further includes:

when determining, according to the indication flag, that the first LSP and the second LSP are successfully stitched, using, by the first network device, the third LSP to bear a service packet sent to the target network device; or when determining, according to the indication flag, that the first LSP and the second LSP are unsuccessfully stitched, prohibiting, by the first network device, using the third LSP to bear a service packet sent to the target network device.

With reference to the first aspect or the first possible implementation manner of the first aspect, a second possible implementation manner of the first aspect is further provided. In the second possible implementation manner of the first aspect, after the establishing the first LSP, the method further includes:

detecting, by the first network device, whether the target network device is reachable by using the third LSP; and if the target network device is reachable by using the third LSP, using the third LSP to bear the service packet sent to the target network device; or if the target network device is unreachable by using the third LSP, prohibiting using the third LSP to bear the service packet sent to the target network device.

With reference to the first aspect or either of the foregoing possible implementation manners of the first aspect, a third possible implementation manner of the first aspect is further provided. In the third possible implementation manner of the first aspect, that the first Path message carries the address of the second network device and the address of the target network device includes:

extending a session object (Session Object) of the first Path message to carry the address of the second network device and the address of the target network device.

With reference to the first aspect or any one of the foregoing possible implementation manners of the first aspect, a fourth possible implementation manner of the first aspect is further provided. In the fourth possible implementation manner of the first aspect, the address of the second network device is pre-configured on the first network device; or the first network device obtains the address of the second network device by receiving an address advertisement message sent by the second network device, where the address advertisement message includes the address of the second network device.

With reference to the first aspect or any one of the foregoing possible implementation manners of the first aspect, a fifth possible implementation manner of the first aspect is further provided. In the fifth possible implementation manner of the first aspect, the method further includes:

generating, by the first network device, a second Path message based on RSVP-TE, where the second Path message carries an address of a third network device, and the second Path message is used to request establishment of a fourth LSP that is based on RSVP-TE and is from the first network device to the third network device; and sending, by the first network device, the second Path message to the third network device, and establishing the fourth LSP, where the second Path message further carries the address of the target network device, so that the third network device stitches the fourth LSP and a fifth LSP according to the address of the target network device, so as to further form a sixth LSP from the first network device to the target network device in an end-to-end manner, where the fifth LSP is an LSP pre-established between the third network device and the target network device.

According to a second aspect, an embodiment of the present invention provides an LSP establishment method, including:

receiving, by a second network device, a Path message that is based on RSVP-TE and is sent by a first network device, where the Path message carries an address of the second network device and an address of a target network device, and the Path message is used to request establishment of a first LSP that is based on RSVP-TE and is from the first network device to the second network device;

sending, by the second network device, a Resv message corresponding to the Path message to the first network device, so that the first network device establishes the first LSP; and stitching, by the second network device, the first LSP and a second LSP according to the address of the target network device, so as to further form a third LSP from the first network device to the target network device in an end-to-end manner, where the second LSP is an LSP pre-established between the second network device and the target network device.

In a first possible implementation manner of the second aspect, the Resv message includes an indication flag used to indicate whether the first LSP and the second LSP are successfully stitched, so that when determining, according to the indication flag, that the first LSP and the second LSP are successfully stitched, the first network uses the third LSP to bear a service packet sent to the target network device; or when determining, according to the indication flag, that the first LSP and the second LSP are unsuccessfully stitched, the first network prohibits using the third LSP to bear a service packet sent to the target network device.

With reference to the second aspect or the first possible implementation manner of the second aspect, a second possible implementation manner of the second aspect is further provided. In the second possible implementation manner of the second aspect, the method further includes:

sending, by the second network device, the address of the second network device to the first network device in advance by using an address advertisement message, so that the first network device sends the Path message to the second network device according to the address of the second network device.

According to a third aspect, an embodiment of the present invention provides a first network device, including: a generating unit, configured to generate a first Path message based on RSVP-TE, where the first Path message carries an address of a second network device, and the first Path message is used to request establishment of a first LSP that is based on RSVP-TE and is from the first network device to the second network device; and an establishing unit, configured to establish the first LSP, where the first Path message further carries an address of a target network device, so that the second network device stitches the first LSP and a second LSP according to the address of the target network device, so as to further form a third LSP from the first network device to the target network device in an end-to-end manner, where the second LSP is an LSP pre-established between the second network device and the target network device.

In a first possible implementation manner of the third aspect, the establishing the first LSP further includes receiving a first Resv message that is sent by the second network device and is corresponding to the first Path message, where the first Resv message includes an indication flag used to indicate whether the first LSP and the second LSP are successfully stitched, and the first network device further includes a judging unit and a first determining unit, where the judging unit is configured to determine, according to the indication flag, whether the first LSP and the second LSP are successfully stitched; and the first determining unit is configured to: when the judging unit determines that the first LSP and the second LSP are successfully stitched, determine to use the third LSP to bear a service packet sent to the target network device; or when the judging unit determines that the first LSP and the second LSP are unsuccessfully stitched, prohibit using the third LSP to bear a service packet sent to the target network device.

With reference to the third aspect or the first possible implementation manner of the third aspect, a second possible implementation manner of the third aspect is further provided. In the second possible implementation manner of the third aspect, the first network device further includes a detecting unit and a second determining unit, where the detecting unit is configured to detect whether the first network device can reach the target network device by using the third LSP; and the second determining unit is configured to: when the detecting unit detects that the target network device is reachable by using the third LSP, determine to use the third LSP to bear the service packet sent to the target network device; or when the detecting unit detects that the target network device is unreachable by using the third LSP, prohibit using the third LSP to bear the service packet sent to the target network device.

With reference to the third aspect or either of the foregoing possible implementation manners of the third aspect, a third possible implementation manner of the third aspect is further provided. In the third possible implementation manner of the third aspect, the first network device further includes a configuring unit or an acquiring unit, where the configuring unit is configured to pre-configure the address of the second network device on the first network device;

a receiving unit is configured to receive an address advertisement message sent by the second network device, where the address advertisement message includes the address of the second network device; and the acquiring unit is configured to acquire the address of the second network device according to the address advertisement message received by the receiving unit.

With reference to the third aspect or any one of the foregoing possible implementation manners of the third aspect, a fourth possible implementation manner of the third aspect is further provided. In the fourth possible implementation manner of the third aspect, the generating unit is further configured to generate a second path (Path) message based on RSVP-TE, where the second Path message carries an address of a third network device, and the second Path message is used for establishing a fourth LSP that is based on RSVP-TE and is from the first network device to the third network device;

the sending unit is further configured to send the second Path message to the third network device;

the establishing unit is further configured to establish the fourth LSP, where the second Path message further carries the address of the target network device, so that the third network device stitches the fourth LSP and a fifth LSP according to the address of the target network device, so as to further form a sixth LSP from the first network device to the target network device in an end-to-end manner, where the fifth LSP is an LSP pre-established between the third network device and the target network device; and correspondingly, the first network device further includes a selecting unit, where the selecting unit is configured to select the sixth LSP as a standby LSP for bearing the service packet sent to the target network device, and select the third LSP as an active LSP for bearing the service packet sent to the target network device.

According to a fourth aspect, an embodiment of the present invention provides a second network device, including:

a receiving unit, configured to receive a Path message that is based on RSVP-TE and is sent by a first network device, where the Path message carries an address of the second network device and an address of a target network device, and the Path message is used to request establishment of a first LSP that is based on RSVP-TE and is from the first network device to the second network device;

a sending unit, configured to send a Resv message corresponding to the Path message to the first network device, so that the first network device establishes the first LSP; and a processing unit, configured to stitch the first LSP and a second LSP according to the address of the target network device, so as to further form a third LSP from the first network device to the target network device in an end-to-end manner, where the second LSP is an LSP pre-established between the second network device and the target network device.

In a first possible implementation manner of the fourth aspect, the Resv message includes an indication flag used to indicate whether the first LSP and the second LSP are successfully stitched, so that when determining, according to the indication flag, that the first LSP and the second LSP are successfully stitched, the first network uses the third LSP to bear a service packet sent to the target network device; or when determining, according to the indication flag, that the first LSP and the second LSP are unsuccessfully stitched, the first network prohibits using the third LSP to bear a service packet sent to the target network device.

With reference to the fourth aspect or any one of the foregoing possible implementation manners of the fourth aspect, a second possible implementation manner of the fourth aspect is further provided. In the second possible implementation manner of the fourth aspect, the second network device further includes:

a generating unit, configured to generate an address advertisement message including the address of the second network device, and the sending unit is configured to send the address advertisement message generated by the generating unit to the first network device, so that the first network device sends the Path message to the second network device according to the address of the second network device.

According to the technical solutions provided in the embodiments of the present invention, a first network device sends a first Path message to a second network device, and establishes a first LSP that is based on RSVP-TE and is from the first network device to the second network device, where the first Path message further carries an address of a target network device. In this way, the second network device may stitch the first LSP and a second LSP according to the address of the target network device, so as to further form a third LSP from the first network device to the target network device in an end-to-end manner, where the second LSP is an LSP pre-established between the second network device and the target network device. In this way, the first network device may implement establishment of the third LSP from the first network device to the target network device only by sending the first Path message. When the first LSP is an LSP in an access network of an IP RAN, and the second LSP is an LSP established in an IP backbone network, the LSP based on RSPV-TE in the IP RAN and the LSP established in the IP backbone network may be stitched, which is conducive to implementing convergence of an access network of an IP RAN based on MPLS TE and an IP backbone network.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 7 is schematic diagram showing an optional extended TLV format according to an embodiment of the present invention;

FIG. 8 is schematic diagram showing another optional extended TLV format according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
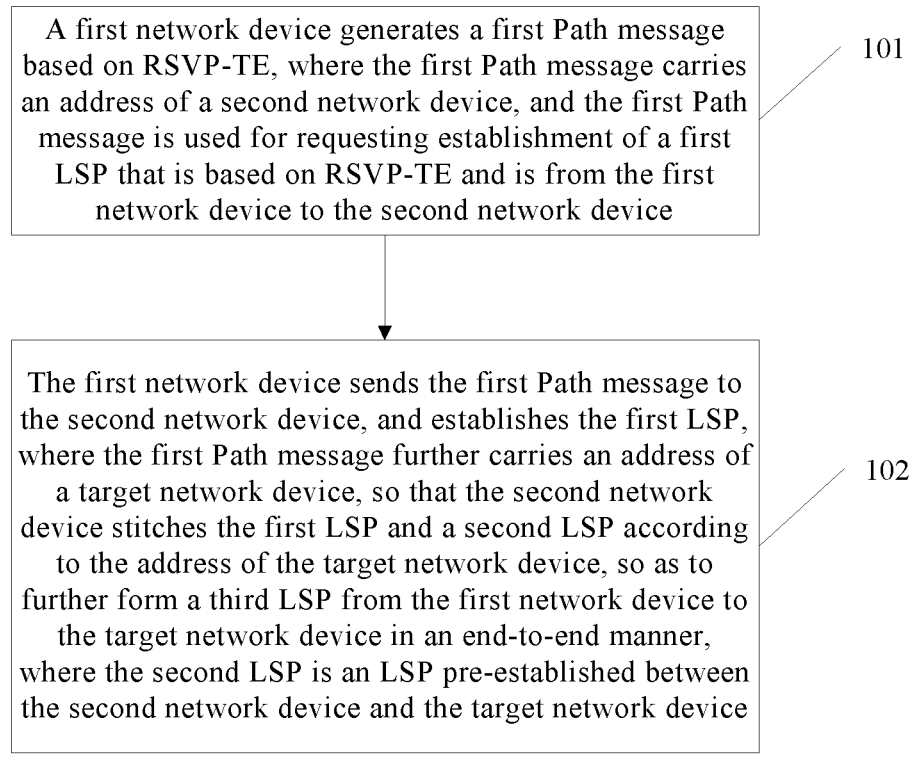
FIG. 1 shows an LSP establishment method according to an embodiment of the present invention.

Referring to FIG. 1, FIG. 1 shows an LSP establishment method according to an embodiment of the present invention. The method includes:

101. A first network device generates a first path Path message based on RSVP-TE, where the first Path message carries an address of a second network device, and the first Path message is used to request establishment of a first LSP that is based on RSVP-TE and is from the first network device to the second network device.

102. The first network device sends the first Path message to the second network device, and establishes the first LSP, where the first Path message further carries an address of a target network device, so that the second network device stitches the first LSP and a second LSP according to the address of the target network device, so as to further form a third LSP from the first network device to the target network device in an end-to-end manner, where the second LSP is an LSP pre-established between the second network device and the target network device.

The second LSP may be a Border Gateway Protocol (Border Gateway Protocol, BGP) LSP, or an LDP LSP, or an LSP established by using another protocol.

The first LSP is an LSP established based on RSVP-TE. For a detailed process of establishing an LSP based on RSVP-TE, reference may be made to RFC3209, and details are not described herein again. When calculating, for establishing the first LSP, a path corresponding to the first Path message, the first network device performs path calculation by using the second network device as a destination node. When an intermediate network device exists between the first network device and the second network device, the intermediate network device also performs path calculation by using the second network device as a destination node when calculating, for establishing the first LSP, a path corresponding to the first Path message.

Figure 2:
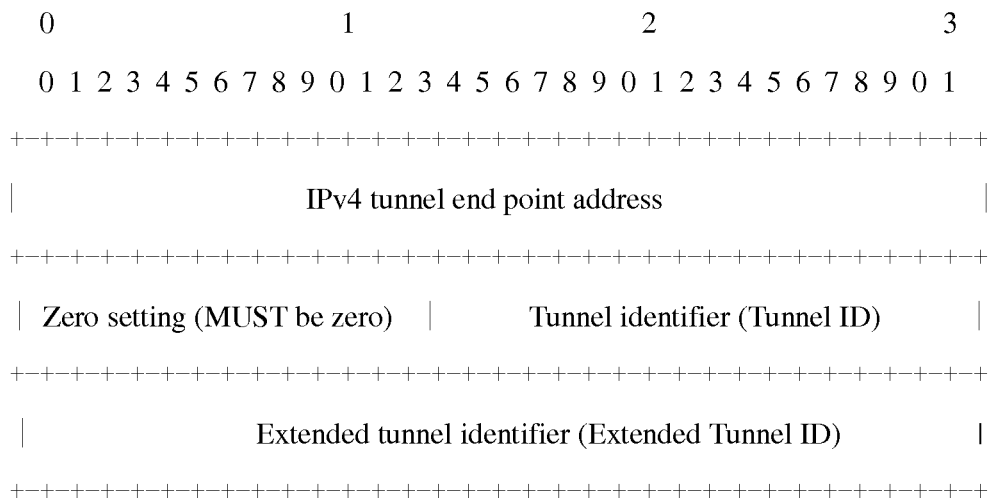
FIG. 2 is a schematic diagram showing a format of an existing Session Object in an RSVP Path message.
Figure 2A:
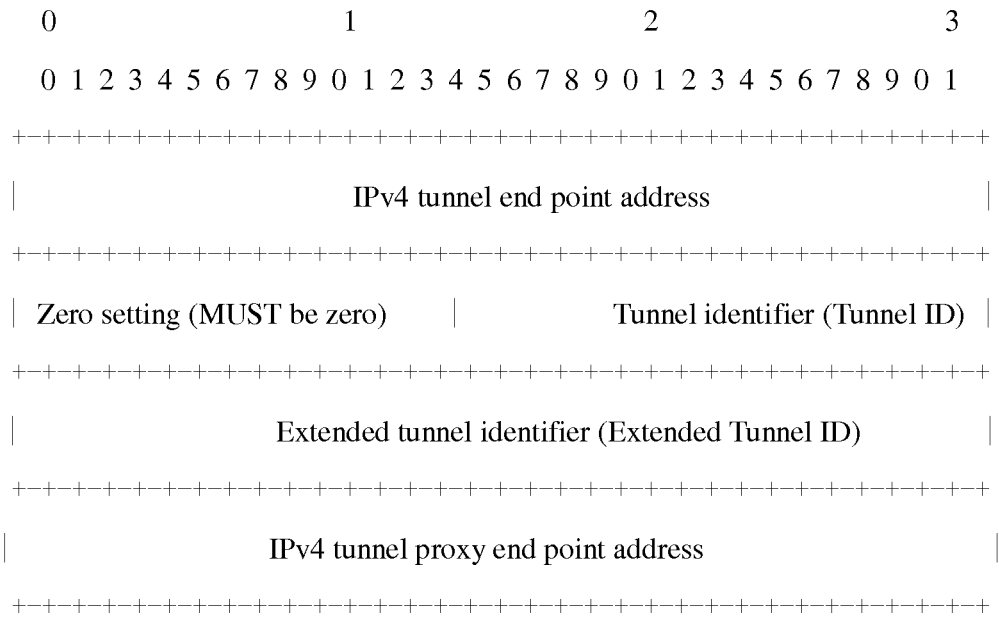
FIG. 2A is a schematic diagram showing a format of an optional Session Object in an RSVP Path message according to an embodiment of the present invention.

Optionally, that the first Path message carries the address of the second network device and the address of the target network device includes:

extending a Session Object of the first Path message to carry the address of the second network device and the address of the target network device. For example, a Session Object of an Internet Protocol version 4 (Internet Protocol version 4, IPv4) LSP tunnel (LSP_TUNNEL_IPv4) type is used as an example. A format of a Session Object packet is shown in FIG. 2. In the embodiment of the present invention, an IPv4 tunnel end point address is used to carry the address of the target network device. Referring to FIG. 2A, one IPv4 tunnel proxy end point address is extended to carry the address of the second network device. After receiving the first Path message, the intermediate network device between the first network device and the second network device performs path calculation by using the IPv4 tunnel proxy end point address as a destination address, and during label allocation, the intermediate network device also uses the IPv4 tunnel proxy end point address to match a routing table, so as to perform label allocation. After receiving the first Path message and when determining that the IPv4 tunnel proxy end point address included in the first Path message is the address of the second network device, the second network device stitches the first LSP and the second LSP according to the address of the target network device. Stitching the first LSP and the second LSP is specifically: when the first LSP is established and after the second network device allocates a first label to an upstream node of the second network device, establishing, by the second network device, a binding relationship between the first label and a second label corresponding to the second LSP, so that the second network device replaces, when receiving a packet whose incoming label is the first label, the first label of the packet with the second label according to the binding relationship, and then sends the packet to the target network device along the second LSP, that is, the third LSP from the first network device to the target network device is formed in an end-to-end manner.

Figure 3:
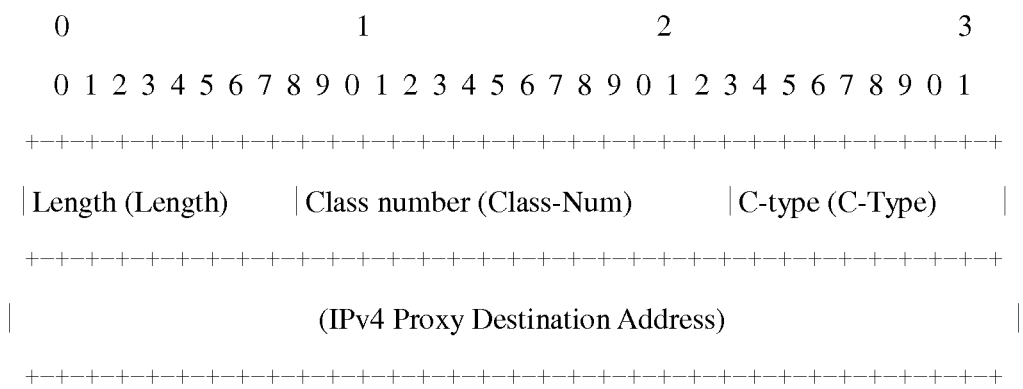
FIG. 3 is a schematic structural diagram of an IPv4-based Proxy Destination Object according to an embodiment of the present invention.

Optionally, one proxy destination object (Proxy Destination Object) is defined in the first Path message to carry the address of the second network device. Referring to FIG. 3, FIG. 3 is a schematic structural diagram of an IPv4-based Proxy Destination Object, where a length (Length) field is used to indicate a total length of the IPv4 Proxy Destination Object;

a class number (Class-Num) field is used to indicate the IPv4 Proxy Destination Object;

a C-type (C-Type) field is used to indicate that the IPv4 Proxy Destination Object is of an IPv4 type; and an IPv4 proxy destination address (IPv4 Proxy Destination Address) field is used to carry the address of the second network device when the address of the second network device is an IPv4 address.

Figure 3A:
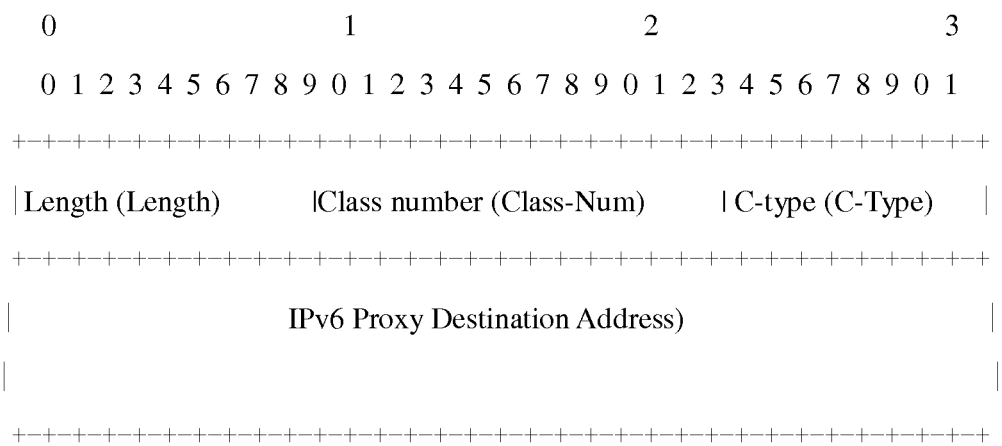
FIG. 3A is a schematic structural diagram of an IPv6-based Proxy Destination Object according to an embodiment of the present invention.

Referring to FIG. 3A, FIG. 3A is a schematic structural diagram of an IPv6-based Proxy Destination Object, where a length (Length) field is used to indicate a total length of the IPv6 Proxy Destination Object;

a class number (Class-Num) field is used to indicate the IPv6 Proxy Destination Object;

a C-type (C-Type) field is used to indicate that the IPv6 Proxy Destination Object is of an IPv6 type; and an IPv6 proxy destination address (IPv6 Proxy Destination Address) field is used to carry the address of the second network device when the address of the second network device is an IPv6 address.

Optionally, in a process of forming the third LSP, the second network device may be understood as a proxy network device, between the first network device and the target network device, for establishing an LSP.

Optionally, the first network device may be any one of the following devices:

a provider edge (Provider Edge, PE), or a cell site gateway (Cell Site Gateway, CSG), or a multi-service transport gateway (Multi-Service Transport Gateway, MSTG), where the CSG may include an agile transport network (agile transport network, ATN) device.

Optionally, the second network device may be a gateway device, for example, a radio network controller site gateway (RNC Site Gateway, RSG) or a multi-service aggregation gateway (Multi-Service Aggregation Gateway, MSAG), where the RSG may include a carrier switch (Carrier Switch, CX) device.

According to the technical solution provided in the embodiment of the present invention, the first network device sends the first Path message to the second network device, and establishes the first LSP that is based on RSVP-TE and is from the first network device to the second network device, where the first Path message carries an address of a target network device. In this way, the second network device may stitch the first LSP and a second LSP according to the address of the target network device, so as to further form a third LSP from the first network device to the target network device in an end-to-end manner. In this way, the first network device may implement establishment of the third LSP from the first network device to the target network device only by sending the first Path message. When the first LSP is an LSP in an access network of an IP RAN, and the second LSP is an LSP established in an IP backbone network, the LSP based on RSPV-TE in the IP RAN and the LSP established in the IP backbone network may be stitched, which is conducive to implementing convergence of an access network of an IP RAN based on MPLS TE and an IP backbone network.

Figure 4:
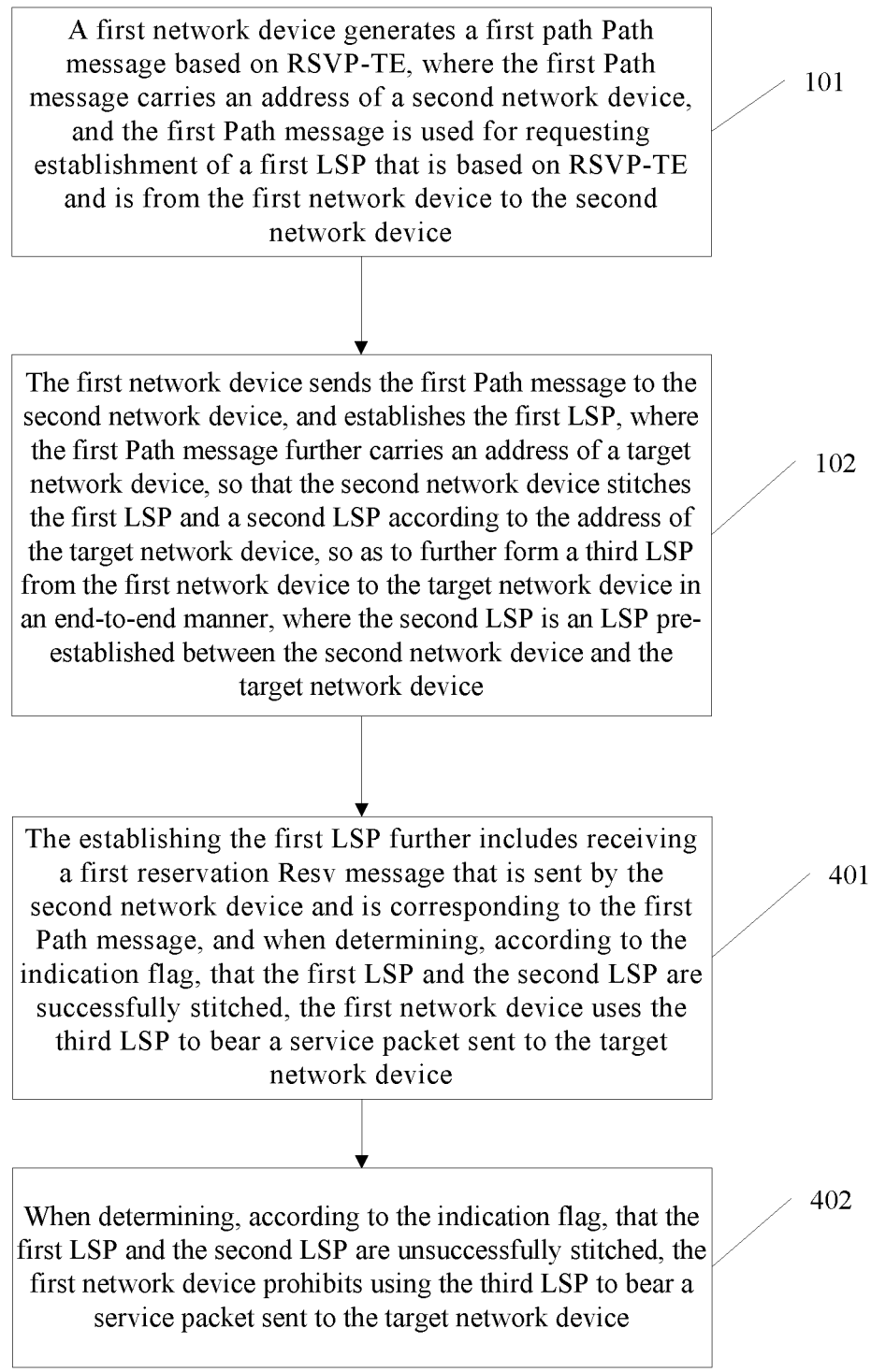
FIG. 4 shows a second LSP establishment method according to an embodiment of the present invention.

Optionally, the establishing the first LSP further includes receiving a first Resv message that is sent by the second network device and is corresponding to the first Path message, where the first Resv message may further include an indication flag used to indicate whether the first LSP and the second LSP are successfully stitched. Referring to FIG. 4, after step 102, the method further includes:

401. When determining, according to the indication flag, that the first LSP and the second LSP are successfully stitched, the first network device uses the third LSP to bear a service packet sent to the target network device.

402. When determining, according to the indication flag, that the first LSP and the second LSP are unsuccessfully stitched, the first network device prohibits using the third LSP to bear a service packet sent to the target network device.

By setting, in the first Resv message, the indication flag indicating whether the first LSP and the second LSP are successfully stitched, a problem of loss of the service packet is avoided, where the problem occurs because the first network device continues using, when the first LSP and the second LSP are unsuccessfully stitched, the third LSP to bear the service packet sent to the target network device.

Figure 5:
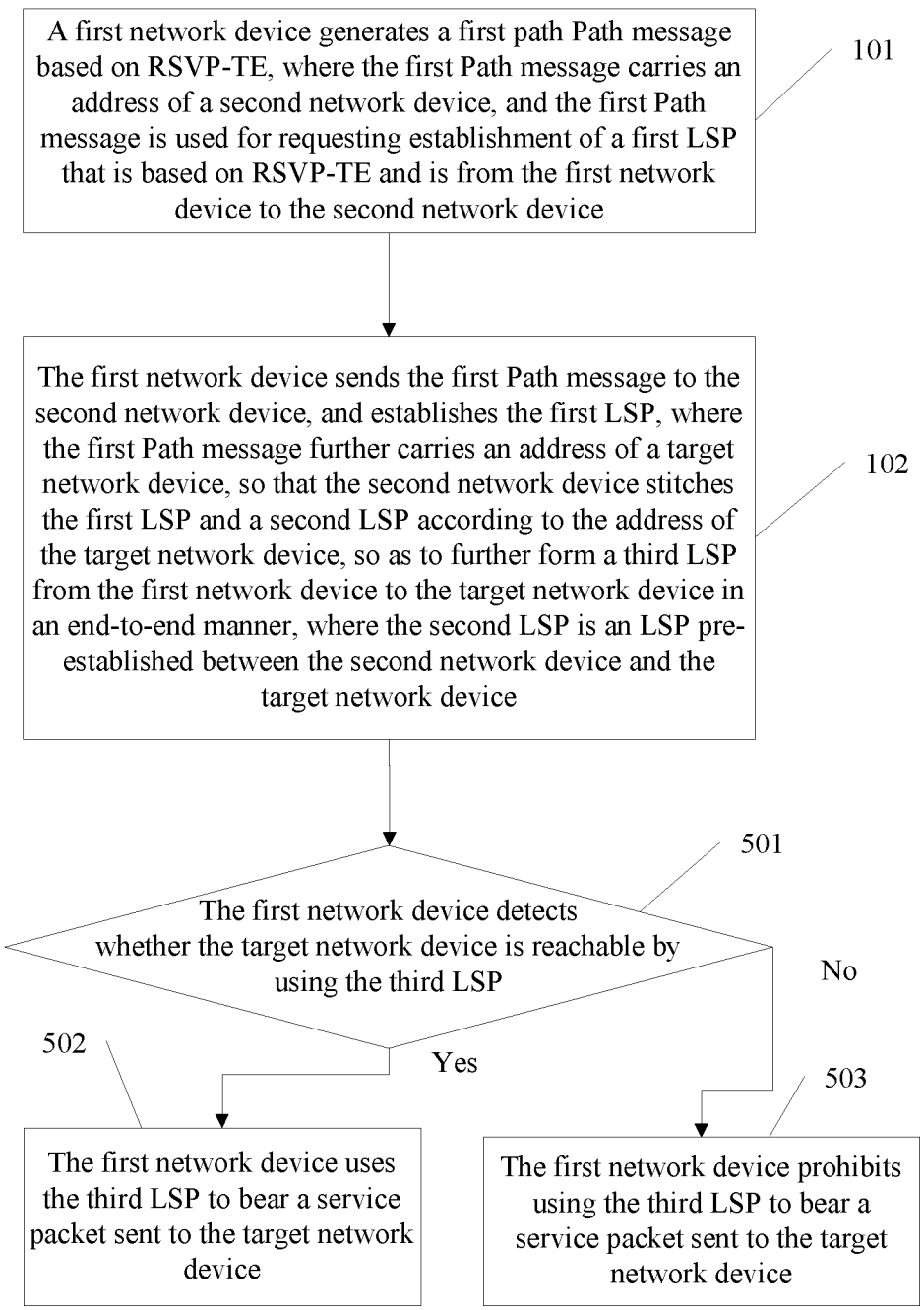
FIG. 5 shows a third LSP establishment method according to an embodiment of the present invention.

Optionally, referring to FIG. 5, after step 102, the method may further include:

501. The first network device detects whether the target network device is reachable by using the third LSP. If the target network device is reachable by using the third LSP, step 502 is executed; or if the target network device is unreachable by using the third LSP, step 503 is executed.

502. The first network device uses the third LSP to bear the service packet sent to the target network device.

503. The first network device prohibits using the third LSP to bear the service packet sent to the target network device.

The detection may be performed when the first LSP and the second LSP are initially stitched, or may be performed when a status of initially stitching the first LSP and the second LSP changes subsequently.

Optionally, the foregoing detection may be implemented by using an LSP packet Internet groper (Packet Internet Groper, Ping).

Optionally, the implementation manner may be further combined with the forgoing implementation manner of detecting whether the first LSP and the second LSP are successfully stitched, and the method may further include:

when the first network device determines, according to the indication flag, that the first LSP and the second LSP are successfully stitched, detecting, by the first network device, whether the target network device is reachable by using the third LSP.

Figure 6:
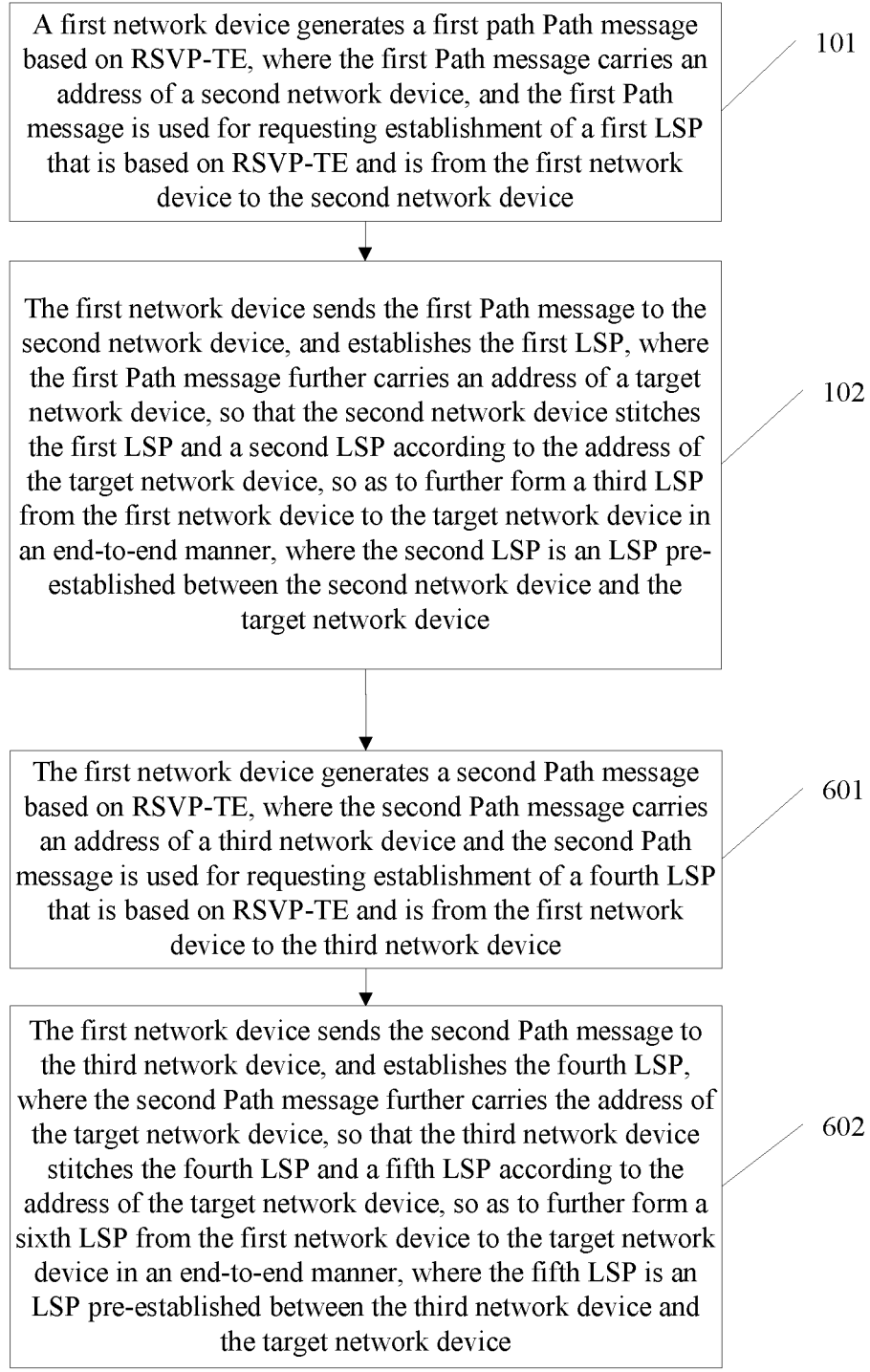
FIG. 6 shows a fourth LSP establishment method according to an embodiment of the present invention.

As one optional implementation manner, as shown in FIG. 6, the method may further include:

601. The first network device generates a second path Path message based on RSVP-TE, where the second Path message carries an address of a third network device, and the second Path message is used to request establishment of a fourth LSP that is based on RSVP-TE and is from the first network device to the third network device.

602. The first network device sends the second Path message to the third network device, and establishes the fourth LSP, where the second Path message further carries the address of the target network device, so that the third network device stitches the fourth LSP and a fifth LSP according to the address of the target network device, so as to further form a sixth LSP from the first network device to the target network device in an end-to-end manner, where the fifth LSP is an LSP pre-established between the third network device and the target network device.

The fifth LSP may be a Border Gateway Protocol BGP LSP, or an LDP LSP, or an LSP established by using another protocol.

By sending the second Path message to the third network device, the first network device may establish the fourth LSP between the first network device and the third network device. In addition, the second Path message includes the address of the target network device, so that the third network device stitches the fourth LSP and the fifth LSP. In this way, the first network device establishes another LSP for reaching, by using the sixth LSP, the target network device. The first network device may select the third LSP as an active LSP for bearing the service packet sent to the target network device, and select the sixth LSP as a standby LSP for bearing the service packet sent to the target network device. In a normal case, the active LSP is in a working state, and the standby LSP is in a backup state. When a fault occurs on the active LSP, the standby LSP changes to a working state from the backup state. In this way, reliability of sending, by the first network device, the service packet to the target network device is improved. The third network device may be understood as a backup proxy network device for establishing an LSP between the first network device and the target network device. The first network device may be understood as an active proxy network device.

Optionally, the method may further include:

pre-configuring the address of the second network device on the first network device; or obtaining, by the first network device, the address of the second network device by receiving an address advertisement message sent by the second network device, where the address advertisement message includes the address of the second network device.

Optionally, the foregoing address advertisement message may be an extension of an Open Shortest Path First (Open Shortest Path First, OSPF) link state advertisement (Link State Advertisement, LSA) message. Specifically, one type-length-value (Type Length Value, TLV) is extended in the LSA message to carry the address of the second network device. For the extended TLV, reference may be made to FIG. 7, where a type (Type) field is used to indicate that the LSA message carries the address of the second network device;

a length (Length) field is used to indicate a data length of the TLV; and an IPv4 address (IPv4 address) field is used to carry the address of the second network device.

Optionally, referring to FIG. 8, the TLV may further include:

a state (State) field, indicating, when a value of the State field is 1, that the second network device is an active proxy network device when an end-to-end LSP is established between the first network device and the target network device; or indicating, when a value of the State field is 0, that the second network device is a standby proxy network device when an end-to-end LSP is established between the first network device and the target network device.

Optionally, the first network device may be located in an access network of an IP RAN or the second network device is located in an IP backbone network of the IP RAN. According to the technical solution provided in the embodiment of the present invention, establishing an LSP by using MPLS TE on an access side of an IP RAN is conducive to implementing convergence of an access network of an IP RAN based on MPLS TE and an IP backbone network.

Figure 9:
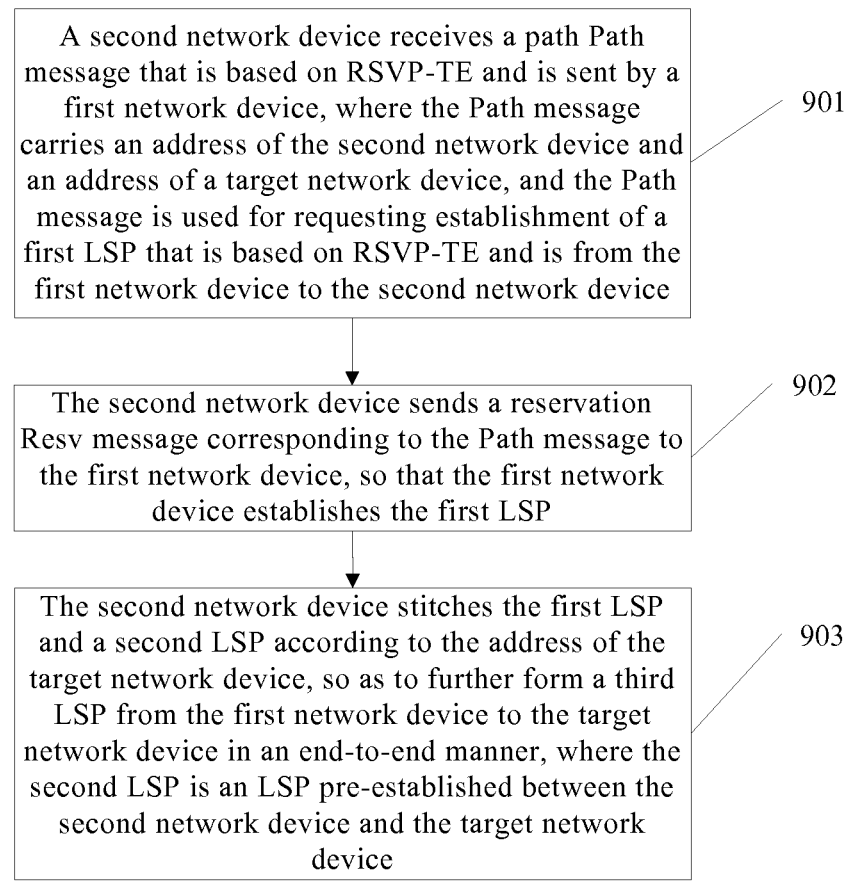
FIG. 9 shows a fifth LSP establishment method according to an embodiment of the present invention.

Referring to FIG. 9, FIG. 9 shows another LSP establishment method according to an embodiment of the present invention. The method includes:

901. A second network device receives a path Path message that is based on RSVP-TE and is sent by a first network device, where the Path message carries an address of the second network device and an address of a target network device, and the Path message is used to request establishment of a first LSP that is based on RSVP-TE and is from the first network device to the second network device.

902. The second network device sends a reservation (Resv) message corresponding to the Path message to the first network device, so that the first network device establishes the first LSP.

903. The second network device stitches the first LSP and a second LSP according to the address of the target network device, so as to further form a third LSP from the first network device to the target network device in an end-to-end manner, where the second LSP is an LSP pre-established between the second network device and the target network device.

Optionally, the first network device may be any one of the following devices:

a PE, a CSG, and an MSTG, where the CSG may include an ATN device.

Optionally, the second network device may be a gateway device, for example, an RSG or an MSAG, where the RSG may include a CX device.

Optionally, the Resv message includes an indication flag used to indicate whether the first LSP and the second LSP are successfully stitched, so that when determining, according to the indication flag, that the first LSP and the second LSP are successfully stitched, the first network uses the third LSP to bear a service packet sent to the target network device; or when determining, according to the indication flag, that the first LSP and the second LSP are unsuccessfully stitched, the first network prohibits using the third LSP to bear a service packet sent to the target network device.

Optionally, the second network device sends the address of the second network device to the first network device in advance by using an address advertisement message, so that the first network device sends the Path message to the second network device according to the address of the second network device.

Optionally, the address advertisement message may be an extension of OSPF LSA message. Specifically, one TLV is extended in the LSA message to carry the address of the second network device. For the extended TLV, reference may be made to FIG. 7, and details are not described herein again.

The first LSP is an LSP established based on RSVP-TE. For a detailed process of establishing an LSP based on RSVP-TE, reference may be made to RFC3209, and details are not described herein again. When calculating, for establishing the first LSP, a path corresponding to the Path message, the first network device performs path calculation by using the second network device as a destination node. When an intermediate network device exists between the first network device and the second network device, the intermediate network device also performs path calculation by using the second network device as a destination node when calculating, for establishing the first LSP, a path corresponding to the Path message.

Optionally, that the Path message carries the address of the second network device and the address of the target network device includes: extending a Session Object of the Path message to carry the address of the second network device and the address of the target network device. For example, a Session Object of an LSP_TUNNEL_IPv4 type is used as an example. A format of a Session Object packet is shown in FIG. 2. In the embodiment of the present invention, an IPv4 tunnel end point address is used to carry the address of the target network device. Referring to FIG. 2A, one IPv4 tunnel proxy end point address is extended to carry the address of the second network device. After receiving the Path message, the intermediate network device between the first network device and the second network device performs path calculation by using the IPv4 tunnel proxy end point address as a destination address, and during label allocation, the intermediate network device also uses the IPv4 tunnel proxy end point address to match a routing table, so as to perform label allocation. After receiving the Path message and when determining that the IPv4 tunnel proxy end point address included in the Path message is the address of the second network device, the second network device stitches the first LSP and the second LSP according to the address of the target network device. Specifically, when the first LSP is established and after the second network device allocates a first label to an upstream node, the second network device establishes a binding relationship between the first label and a second label corresponding to the second LSP, so that the second network device replaces, when receiving a packet whose incoming label is the first label, the first label of the packet with the second label according to the binding relationship, and then sends the packet to the target network device along the second LSP, that is, the third LSP from the first network device to the target network device is formed in an end-to-end manner.

Optionally, one Proxy Destination Object is defined in the Path message to carry the address of the second network device. Referring to FIG. 3, FIG. 3 is a schematic structural diagram of an IPv4-based Proxy Destination Object. The IPv4-based Proxy Destination Object has been described in detail in the embodiment shown in FIG. 1, and details are not described herein again. Referring to FIG. 3A, FIG. 3A is a schematic structural diagram of an IPv6-based Proxy Destination Object. The IPv6-based Proxy Destination Object has been described in detail in the embodiment shown in FIG. 1, and details are not described herein again.

Optionally, in a process of forming the third LSP, the second network device may be understood as a proxy network device, between the first network device and the target network device, for establishing an LSP.

According to the technical solution provided in the embodiment of the present invention, the first network device sends the first Path message to the second network device, and establishes the first LSP that is based on RSVP-TE and is from the first network device to the second network device, where the first Path message carries an address of a target network device. In this way, the second network device may stitch the first LSP and a second LSP according to the address of the target network device, so as to further form a third LSP from the first network device to the target network device in an end-to-end manner. In this way, the first network device may implement establishment of the third LSP from the first network device to the target network device only by sending the first Path message. When the first LSP is an LSP in an access network of an IP RAN, and the second LSP is an LSP established in an IP backbone network, the LSP based on RSPV-TE in the IP RAN and the LSP established in the IP backbone network may be stitched, which is conducive to implementing convergence of an access network of an IP RAN based on MPLS TE and an IP backbone network.

Figure 10:
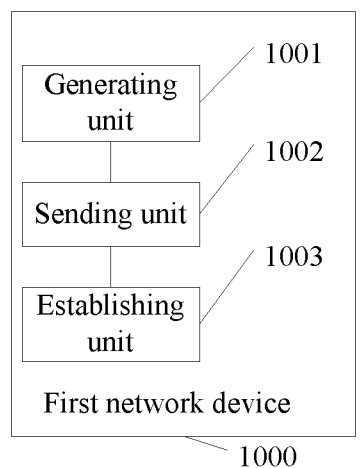
FIG. 10 shows a first network device according to an embodiment of the present invention.

Referring to FIG. 10, an embodiment of the present invention provides a first network device 1000. The first network device 1000 may be the first network device in the foregoing method embodiments. The first network device 1000 includes:

a generating unit 1001, configured to generate a first path Path message based on RSVP-TE, where the first Path message carries an address of a second network device, and the first Path message is used to request establishment of a first LSP that is based on RSVP-TE and is from the first network device 1000 to the second network device;

a sending unit 1002, configured to send the first Path message generated by the generating unit 1001 to the second network device; and an establishing unit 1003, configured to establish the first LSP, where the first Path message further carries an address of a target network device, so that the second network device stitches the first LSP and a second LSP according to the address of the target network device, so as to further form a third LSP from the first network device 1000 to the target network device in an end-to-end manner, where the second LSP is an LSP pre-established between the second network device and the target network device.

The second LSP may be a Border Gateway Protocol (Border Gateway Protocol, BGP) LSP, or an LDP LSP, or an LSP established by using another protocol.

Optionally, the establishing the first LSP further includes receiving a first Resv message that is sent by the second network device and is corresponding to the first Path message, where the first Resv message includes an indication flag used to indicate whether the first LSP and the second LSP are successfully stitched, and the first network device 1000 further includes a judging unit and a first determining unit, where the judging unit is configured to determine, according to the indication flag, whether the first LSP and the second LSP are successfully stitched; and the first determining unit is configured to: when the judging unit determines that the first LSP and the second LSP are successfully stitched, determine to use the third LSP to bear a service packet sent to the target network device; or when the judging unit determines that the first LSP and the second LSP are unsuccessfully stitched, prohibit using the third LSP to bear a service packet sent to the target network device.

According to the technical solution provided in the embodiment of the present invention, the first network device 1000 sends the first Path message to the second network device, and establishes the first LSP that is based on RSVP-TE and is from the first network device 1000 to the second network device, where the first Path message carries an address of a target network device. In this way, the second network device may stitch the first LSP and a second LSP according to the address of the target network device, so as to further form a third LSP from the first network device 1000 to the target network device in an end-to-end manner. In this way, the first network device 1000 may implement establishment of the third LSP from the first network device 1000 to the target network device only by sending the first Path message. When the first LSP is an LSP in an access network of an IP RAN, and the second LSP is an LSP established in an IP backbone network, the LSP based on RSPV-TE in the IP RAN and the LSP established in the IP backbone network may be stitched, which is conducive to implementing convergence of an access network of an IP RAN based on MPLS TE and an IP backbone network.

Optionally, the first network device 1000 further includes a configuring unit or an acquiring unit, where the configuring unit is configured to pre-configure the address of the second network device on the first network device 1000;

a receiving unit is further configured to receive an address advertisement message sent by the second network device, where the address advertisement message includes the address of the second network device; and the acquiring unit is configured to acquire the address of the second network device according to the address advertisement message received by the receiving unit.

Optionally, the first network device 1000 further includes a detecting unit and a second determining unit, where the detecting unit is configured to detect whether the first network device 1000 can reach the target network device by using the third LSP; and the second determining unit is configured to: when the detecting unit detects that the target network device is reachable by using the third LSP, determine to use the third LSP to bear the service packet sent to the target network device; or when the detecting unit detects that the target network device is unreachable by using the third LSP, prohibit using the third LSP to bear the service packet sent to the target network device.

By setting, in the first Resv message, the indication flag indicating whether the first LSP and the second LSP are successfully stitched, a problem of loss of the service packet is avoided, where the problem occurs because the first network device 1000 continues using, when the first LSP and the second LSP are unsuccessfully stitched, the third LSP to bear the service packet sent to the target network device.

Optionally, the generating unit 1001 is further configured to generate a second path Path message based on RSVP-TE, where the second Path message carries an address of a third network device, and the second Path message is used for establishing a fourth LSP that is based on RSVP-TE and is from the first network device 1000 to the third network device;

the sending unit 1002 is further configured to send the second Path message to the third network device; and the establishing unit 1003 is further configured to establish the fourth LSP, where the second Path message further carries the address of the target network device, so that the third network device stitches the fourth LSP and a fifth LSP according to the address of the target network device, so as to further form a sixth LSP from the first network device 1000 to the target network device in an end-to-end manner, where the fifth LSP is an LSP pre-established between the third network device and the target network device.

Correspondingly, the first network device 1000 further includes a selecting unit, where the selecting unit is configured to select the sixth LSP as a standby LSP for bearing the service packet sent to the target network device, and select the third LSP as an active LSP for bearing the service packet sent to the target network device.

By sending the second Path message to the third network device, the first network device 1000 may establish the fourth LSP between the first network device 1000 and the third network device. In addition, the second Path message includes the address of the target network device, so that the third network device stitches the fourth LSP and the fifth LSP. In this way, the first network device 1000 establishes another LSP for reaching, by using the sixth LSP, the target network device. The first network device 1000 may select the third LSP as an active LSP for bearing the service packet sent to the target network device, and select the sixth LSP as a standby LSP for bearing the service packet sent to the target network device. In a normal case, the active LSP is in a working state, and the standby LSP is in a backup state. When a fault occurs on the active LSP, the standby LSP changes to a working state from the backup state. In this way, reliability of sending, by the first network device 1000, the service packet to the target network device is improved. The third network device may be understood as a backup proxy network device for establishing an LSP between the first network device 1000 and the target network device. The first network device 1000 may be understood as an active proxy network device.

Figure 11:
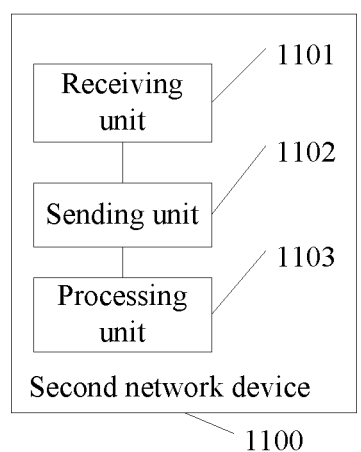
FIG. 11 shows a second network device according to an embodiment of the present invention.

Referring to FIG. 11, an embodiment of the present invention provides a second network device 1100. The second network device 1100 may be the second network device in the foregoing method embodiments. The second network device 1100 includes:

a receiving unit 1101, configured to receive a path Path message that is based on RSVP-TE and is sent by a first network device, where the Path message carries an address of the second network device 1100 and an address of a target network device, and the Path message is used to request establishment of a first LSP that is based on RSVP-TE and is from the first network device to the second network device 1100;

a sending unit 1102, configured to send a reservation (Resv) message corresponding to the Path message to the first network device, so that the first network device establishes the first LSP; and a processing unit 1103, configured to stitch the first LSP and a second LSP according to the address of the target network device, so as to further form a third LSP from the first network device to the target network device in an end-to-end manner, where the second LSP is an LSP pre-established between the second network device 1100 and the target network device.

Optionally, the Resv message includes an indication flag used to indicate whether the first LSP and the second LSP are successfully stitched, so that when determining, according to the indication flag, that the first LSP and the second LSP are successfully stitched, the first network uses the third LSP to bear a service packet sent to the target network device; or when determining, according to the indication flag, that the first LSP and the second LSP are unsuccessfully stitched, the first network prohibits using the third LSP to bear a service packet sent to the target network device.

By setting, in the Resv message, the indication flag indicating whether the first LSP and the second LSP are successfully stitched, a problem of loss of the service packet is avoided, where the problem occurs because the first network device continues using, when the first LSP and the second LSP are unsuccessfully stitched, the third LSP to bear the service packet sent to the target network device.

According to the technical solution provided in the embodiment of the present invention, the first network device sends the first Path message to the second network device 1100, and establishes the first LSP that is based on RSVP-TE and is from the first network device to the second network device 1100, where the first Path message further carries an address of a target network device. In this way, the second network device 1100 may stitch the first LSP and a second LSP according to the address of the target network device, so as to further form a third LSP from the first network device to the target network device in an end-to-end manner. In this way, the first network device may implement establishment of the third LSP from the first network device to the target network device only by sending the first Path message. When the first LSP is an LSP in an access network of an IP RAN, and the second LSP is an LSP established in an IP backbone network, the LSP based on RSPV-TE in the IP RAN and the LSP established in the IP backbone network may be stitched, which is conducive to implementing convergence of an access network of an IP RAN based on MPLS TE and an IP backbone network.

Optionally, the second network device 1100 further includes:

a generating unit, configured to generate an address advertisement message including the address of the second network device 1100, where the sending unit is further configured to send the address advertisement message generated by the generating unit to the first network device, so that the first network device sends the Path message to the second network device 1100 according to the address of the second network device 1100.

Optionally, the address advertisement message may be an extension of OSPF LSA. Specifically, one TLV is extended in the LSA message to carry the address of the second network device 1100. For the extended TLV, reference may be made to FIG. 7, and details are not described herein again.

Figure 12:
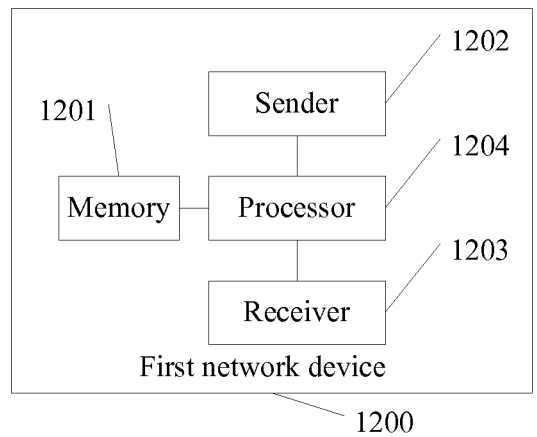
FIG. 12 shows another first network device according to an embodiment of the present invention.

Referring to FIG. 12, an embodiment of the present invention provides a first network device 1200. The first network device 1200 may be the first network device in the foregoing method embodiments. The first network device 1200 includes: a memory 1201, a sender 1202, a receiver 1203, and a processor 1204 that is separately connected to the memory 1201, the sender 1202, and the receiver 1203, where the memory 1201 is configured to store a group of program code, and the processor 1204 is configured to invoke a program stored in the memory 1201 to execute the following operations:

generating a first path Path message based on RSVP-TE, where the first Path message carries an address of a second network device, and the first Path message is used to request establishment of a first LSP that is based on RSVP-TE and is from the first network device 1200 to the second network device;

controlling the sender 1202 to send the first Path message to the second network device; and establishing the first LSP, where the first Path message further carries an address of a target network device, so that the second network device stitches the first LSP and a second LSP according to the address of the target network device, so as to further form a third LSP from the first network device 1200 to the target network device in an end-to-end manner, where the second LSP is an LSP pre-established between the second network device and the target network device.

Optionally, the establishing the first LSP further includes receiving a first Resv message that is sent by the second network device and is corresponding to the first Path message, where the first Resv message may further include an indication flag used to indicate whether the first LSP and the second LSP are successfully stitched. After the operation of establishing the first LSP according to the first Resv message, the processor 1204 may be further configured to execute the following operations:

when it is determined, according to the indication flag, that the first LSP and the second LSP are successfully stitched, using the third LSP to bear a service packet sent to the target network device; or when it is determined, according to the indication flag, that the first LSP and the second LSP are unsuccessfully stitched, prohibiting using the third LSP to bear a service packet sent to the target network device.

By setting, in the first Resv message, the indication flag indicating whether the first LSP and the second LSP are successfully stitched, a problem of loss of the service packet is avoided, where the problem occurs because the first network device 1200 continues using, when the first LSP and the second LSP are unsuccessfully stitched, the third LSP to bear the service packet sent to the target network device.

Optionally, the processor 1204 may be further configured to execute the following operations:

detecting whether the first network device 1200 can reach the target network device by using the third LSP; when it is detected that the target network device is reachable by using the third LSP, determining to use the third LSP to bear the service packet sent to the target network device; or when it is detected that the target network device is unreachable by using the third LSP, prohibiting using the third LSP to bear the service packet sent to the target network device.

The detection may be performed when the first LSP and the second LSP are initially stitched, or may be performed when a status of initially stitching the first LSP and the second LSP changes subsequently.

Optionally, the processor 1204 may be further configured to execute the following operations:

generating a second path Path message based on RSVP-TE, where the second Path message carries an address of a third network device, and the second Path message is used for establishing a fourth LSP that is based on RSVP-TE and is from the first network device 1200 to the third network device;

controlling the sender 1202 to send the second Path message to the third network device;

establishing the fourth LSP, where the second Path message further carries the address of the target network device, so that the third network device stitches the fourth LSP and a fifth LSP according to the address of the target network device, so as to further form a sixth LSP from the first network device 1200 to the target network device in an end-to-end manner, where the fifth LSP is an LSP pre-established between the third network device and the target network device; and selecting the sixth LSP as a standby LSP for bearing the service packet sent to the target network device, and selecting the third LSP as an active LSP for bearing the service packet sent to the target network device.

Optionally, the processor 1204 may be further configured to execute the following operations:

pre-configuring the address of the second network device on the first network device 1200; or enabling the first network device 1200 to obtain the address of the second network device by receiving an address advertisement message sent by the second network device, where the address advertisement message includes the address of the second network device.

Figure 13:
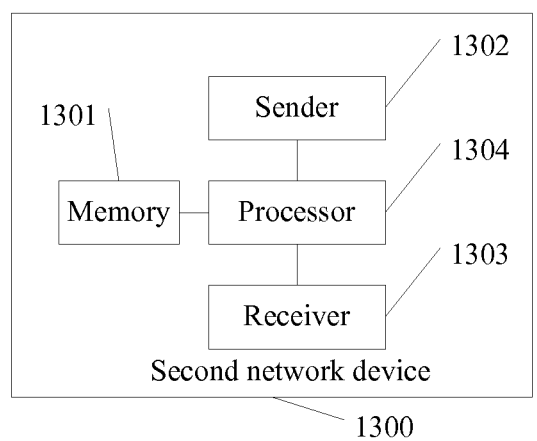
FIG. 13 shows another second network device according to an embodiment of the present invention.

Referring to FIG. 13, an embodiment of the present invention provides a second network device 1300. The second network device 1300 may be the second network device in the foregoing method embodiments. The second network device 1300 includes: a memory 1301, a sender 1302, a receiver 1303, and a processor 1304 that is separately connected to the memory 1301, the sender 1302, and the receiver 1303, where the memory 1301 is configured to store a group of program code, and the processor 1304 is configured to invoke a program stored in the memory 1301 to execute the following operations:

controlling the receiver 1303 to receive a Path message that is based on RSVP-TE and is sent by a first network device, where the Path message carries an address of the second network device 1300 and an address of a target network device, and the Path message is used to request establishment of a first LSP that is based on RSVP-TE and is from the first network device to the second network device 1300;

controlling the sender 1302 to send a reservation Resv message corresponding to the Path message to the first network device, so that the first network device establishes the first LSP; and stitching the first LSP and a second LSP according to the address of the target network device, so as to further form a third LSP from the first network device to the target network device in an end-to-end manner, where the second LSP is an LSP pre-established between the second network device 1300 and the target network device.

Optionally, the Resv message includes an indication flag used to indicate whether the first LSP and the second LSP are successfully stitched, so that when determining, according to the indication flag, that the first LSP and the second LSP are successfully stitched, the first network uses the third LSP to bear a service packet sent to the target network device; or when determining, according to the indication flag, that the first LSP and the second LSP are unsuccessfully stitched, the first network prohibits using the third LSP to bear a service packet sent to the target network device.

Optionally, the processor 1304 may further send the address of the second network device 1300 to the first network device in advance by using an address advertisement message, so that the first network device sends the Path message to the second network device 1300 according to the address of the second network device 1300.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A Label Switched Path (LSP) establishment method, comprising:
   generating, by a first network device, a first Path message based on Resource Reservation Protocol-Traffic Engineering (RSVP-TE), wherein one proxy destination object is defined in the first Path message to carry an Internet Protocol (IP) address of a second network device, and the first Path message is used to request establishment of a first LSP based on RSVP-TE and is from the first network device to the second network device;
   sending, by the first network device, the first Path message to the second network device, and establishing the first LSP, wherein the establishing the first LSP comprises receiving a first Reservation (Resv) message sent by the second network device and is corresponding to the first Path message; wherein the first Path message further carries an IP address of a target network device, to enable the second network device to stitch the first LSP and a second LSP according to the IP address of the target network device to form a third LSP from the first network device to the target network device in an end-to-end manner, wherein the second LSP is an LSP pre-established between the second network device and the target network device; and
   when the first LSP is established and after the second network device allocates a first label to an upstream node of the second network device, establishing, by the second network device, a binding relationship between the first label and a second label corresponding to the second LSP.

2. The method according to claim 1, wherein the first Resv message comprises an indication flag used to indicate whether the first LSP and the second LSP are successfully stitched, and the method further comprises:
   when determining, according to the indication flag, that the first LSP and the second LSP are successfully stitched, using, by the first network device, the third LSP to bear a service packet sent to the target network device; or
   when determining, according to the indication flag, that the first LSP and the second LSP are unsuccessfully stitched, prohibiting, by the first network device, using the third LSP to bear a service packet sent to the target network device.

3. The method according to claim 1, wherein after the establishing the first LSP, the method further comprises:
   detecting, by the first network device, whether the target network device is reachable by using the third LSP; and if the target network device is reachable by using the third LSP, using the third LSP to bear the service packet sent to the target network device; or if the target network device is unreachable by using the third LSP, prohibiting using the third LSP to bear the service packet sent to the target network device.

4. The method according to claim 1, wherein the first Path message carries the IP address of the second network device and the IP address of the target network device comprises:
   extending a session object (Session Object) of the first Path message to carry the IP address of the second network device and the IP address of the target network device.

5. The method according to claim 1, wherein the method comprises:
   pre-configuring the IP address of the second network device on the first network device; or obtaining, by the first network device, the IP address of the second network device by receiving an IP address advertisement message sent by the second network device, wherein the IP address advertisement message comprises the IP address of the second network device.

6. The method according to claim 1, wherein the method further comprises:
   generating, by the first network device, a second Path message based on RSVP-TE, wherein the second Path message carries an IP address of a third network device, and the second Path message is used to request establishment of a fourth LSP based on RSVP-TE and is from the first network device to the third network device; and
   sending, by the first network device, the second Path message to the third network device, and establishing the fourth LSP, wherein the second Path message further carries the IP address of the target network device, to enable the third network device to stitch the fourth LSP and a fifth LSP according to the IP address of the target network device to form a sixth LSP from the first network device to the target network device in an end-to-end manner, wherein the fifth LSP is an LSP pre-established between the third network device and the target network device.

7. A Label Switched Path (LSP) establishment method, comprising:
   receiving, by a second network device, a Path message based on Resource Reservation Protocol-Traffic Engineering (RSVP-TE) and sent by a first network device, wherein one proxy destination object is defined in the first Path message to carry an Internet Protocol (IP) address of a second network device and an IP address of a target network device, and the Path message is used to request establishment of a first LSP based on RSVP-TE and is from the first network device to the second network device;
   sending, by the second network device, a Reservation (Resv) message corresponding to the Path message to the first network device to enable the first network device to establish the first LSP; and
   stitching, by the second network device, the first LSP and a second LSP according to the IP address of the target network device to form a third LSP from the first network device to the target network device in an end-to-end manner, wherein the second LSP is an LSP pre-established between the second network device and the target network device; and
   when the first LSP is established and after the second network device allocates a first label to an upstream node of the second network device, establishing, by the second network device, a binding relationship between the first label and a second label corresponding to the second LSP.

8. The method according to claim 7, wherein the Resv message comprises an indication flag used to indicate whether the first LSP and the second LSP are successfully stitched, when determining, according to the indication flag, that the first LSP and the second LSP are successfully stitched, the first network device uses the third LSP to bear a service packet sent to the target network device; or when determining, according to the indication flag, that the first LSP and the second LSP are unsuccessfully stitched, the first network prohibits using the third LSP to bear a service packet sent to the target network device.

9. The method according to claim 7, wherein the method further comprises:

sending, by the second network device, the IP address of the second network device to the first network device in advance by using an IP address advertisement message, to enable the first network device to send the Path message to the second network device according to the IP address of the second network device.

10. A first network device, comprising:
a processor; and
a non-transitory computer-readable storage medium storing a program to be executed by the processor, the program comprising instructions to cause the first network device to:

generate a first Path message based on Resource Reservation Protocol-Traffic Engineering (RSVP-TE), wherein one proxy destination object is defined in the first Path message to carry an Internet Protocol (IP) address of a second network device, and the first Path message is used to request establishment of a first Label Switched Path (LSP) based on RSVP-TE and is from the first network device to the second network device;

send the first Path message to the second network device; and establish the first LSP, wherein the first Path message further carries an IP address of a target network device, to enable the second network device to stitch the first LSP and a second LSP according to the IP address of the target network device to form a third LSP from the first network device to the target network device in an end-to-end manner, wherein the second LSP is an LSP pre-established between the second network device and the target network device; and when the first LSP is established and after the second network device allocates a first label to an upstream node of the second network device, establish, by the second network device, a binding relationship between the first label and a second label corresponding to the second LSP.

11. The first network device according to claim 10, wherein the establishing the first LSP further comprises receiving a first Reservation (Resv) message sent by the second network device and is corresponding to the first Path message, wherein the first Resv message comprises an indication flag used to indicate whether the first LSP and the second LSP are successfully stitched, and the program comprising instructions to:

determine, according to the indication flag, whether the first LSP and the second LSP are successfully stitched; and when determining that the first LSP and the second LSP are successfully stitched, determine to use the third LSP to bear a service packet sent to the target network device; or when determining that the first LSP and the second LSP are unsuccessfully stitched, prohibit using the third LSP to bear a service packet sent to the target network device.

12. The first network device according to claim 10, wherein the program comprising instructions to:

detect whether the first network device can reach the target network device by using the third LSP; and when detecting that the target network device is reachable by using the third LSP, determine to use the third LSP to bear the service packet sent to the target network device; or when detecting that the target network device is unreachable by using the third LSP, prohibit using the third LSP to bear the service packet sent to the target network device.

13. The first network device according to claim 10, wherein the program comprising instructions to:

pre-configure the IP address of the second network device on the first network device;

receive an IP address advertisement message sent by the second network device, wherein the IP address advertisement message comprises the IP address of the second network device; and acquire the IP address of the second network device according to the IP address advertisement message received by the receiving unit.

14. The first network device according to claim 10, wherein the program comprising instructions to:

generate a second Path message based on RSVP-TE, wherein the second Path message carries an IP address of a third network device, and the second Path message is used to establish a fourth LSP based on RSVP-TE and is from the first network device to the third network device;

send the second Path message to the third network device;

establish the fourth LSP, wherein the second Path message further carries the IP address of the target network device, to enable the third network device to stitch the fourth LSP and a fifth LSP according to the IP address of the target network device to form a sixth LSP from the first network device to the target network device in an end-to-end manner, wherein the fifth LSP is an LSP pre-established between the third network device and the target network device; and select the sixth LSP as a standby LSP for bearing the service packet sent to the target network device, and select the third LSP as an active LSP for bearing the service packet sent to the target network device.

15. A second network device, comprising:
a processor; and
a non-transitory computer-readable storage medium storing a program to be executed by the processor, the program comprising instructions to cause the second network device to:

receive a Path message based on Resource Reservation Protocol-Traffic Engineering (RSVP-TE) and sent by a first network device, wherein one proxy destination object is defined in the first Path message to carry an Internet Protocol (IP) address of a second network device and an IP address of a target network device, and the Path message is used to request establishment of a first Label Switched Path (LSP) based on RSVP-TE and is from the first network device to the second network device;

send a Reservation (Resv) message corresponding to the Path message to the first network device, to enable the first network device to establish the first LSP; and stitch the first LSP and a second LSP according to the IP address of the target network device to form a third LSP from the first network device to the target network device in an end-to-end manner, wherein the second LSP is an LSP pre-established between the second network device and the target network device; and when the first LSP is established and after the second network device allocates a first label to an upstream node of the second network device, establish, by the second network device, a binding relationship between the first label and a second label corresponding to the second LSP.

16. The second network device according to claim 15, wherein the Resv message comprises an indication flag used to indicate whether the first LSP and the second LSP are successfully stitched, wherein the program comprising instructions to:
   when determining, according to the indication flag, that the first LSP and the second LSP are successfully stitched, use the third LSP to bear a service packet sent to the target network device; or
   when determining, according to the indication flag, that the first LSP and the second LSP are unsuccessfully stitched, prohibit using the third LSP to bear a service packet sent to the target network device.

17. The second network device according to claim 15, wherein the program comprising instructions to:
   generate an IP address advertisement message comprising the IP address of the second network device;
   send the IP address advertisement message generated to the first network device, to enable the first network device to send the Path message to the second network device according to the IP address of the second network device.

18. The method according to claim 7, wherein the stitching, by the second network device, the first LSP and the second LSP comprising:
   when the first LSP is established and after the second network device allocates a first label to an upstream node of the second network device, establishing, by the second network device, a binding relationship between the first label and a second label corresponding to the second LSP.

19. The method according to claim 18, the method further comprising:
   receiving a packet, by the second network device, wherein the packet comprises the first label;
   replacing, by the second network device, the first label in the packet with the second label according to the binding relationship; and
   sending the packet to the target network device along the second LSP.

* * * * *